Patented June 25, 1940

2,205,954

UNITED STATES PATENT OFFICE 2,205,954

REFINING CAMPHOR

Clyde O. Henke, Wilmington, Del., and Gastaō Etzel, Pitman, N. J., assignors to E. I. du Pont de Nemours & Company, Wilmington, Del., a corporation of Delaware No Drawing. Application September 2, 1936, Serial No. 99,163

4 Claims. (Cl. 260—589)

This invention relates to the purification of both natural and synthetic camphor and more particularly it relates to a process of refining camphor to a desired melting range by a method involving chemical treatment and fractional distillation.

Old and well known procedures for purifying crude natural and synthetic camphor, such as by sublimation, steam distillation, fractional distillation, solvent extraction and recrystallization have been unsatisfactory to a large extent because some of the impurities in crude camphor have so nearly the same boiling range and solubility as camphor itself that entrainment of impurities occurs in distillation treatments and mutual solution and precipitation takes place when attempts are made to refine by recrystallization. While impure camphor may be directly treated by the process of this invention, preferably we treat camphor dissolved in suitable solvents. For example, this process is well suited for the purification of camphor which remains dissolved in the mother liquor that is left after preparation of U. S. P. grade camphor by recrystallization from solvents. Also, highly satisfactory for treatment by our process are solutions of crude synthetic camphor which result from manufacturing procedures like the following, in which camphene is esterified to give an isoborneol ester, the ester being saponified to form isoborneol, and the isoborneol in a solvent such as benzene-cyclohexane mixture being in turn dehydrogenated, preferably in the presence of a dehydrogenation catalyst, to form a benzene-cyclohexane solution of camphor.

Therefore, while it is within the general purpose of this invention to provide a process for preparing camphor of higher melting range by direct treatment of crude camphor in any commonly occurring form, a more particular object is to provide a process for preparation of higher quality camphor by treatment of crude camphor remaining in mother liquors from camphor refining processes and by treatment of solutions of crude camphor which are obtained in the manufacture of synthetic camphor. Other objects will be hereinafter apparent.

These objects are accomplished by changing the boiling point of certain impurities in the crude camphor by treating it, preferably in solution, with an acid condensing agent such as sulfuric acid, neutralizing the mixture with an alkali, and separating the camphor from solvent and impurities by fractional distillation. The fractional distillation is conducted preferably in the presence of an alkali such as lime.

Among other acid condensing agents which may be used instead of sulfuric acid we mention the following: phosphoric acid, hydrogen fluoride, chlor-sulfonic acid, anhydrous aluminum chloride, anhydrous ferric chloride, and fused zinc chloride. The concentration of the acid used may vary widely as from 65–100%, and oleum containing from 1 to 50% free $SO_3$ gives satisfactory results. The amount of acid employed in the treatment may vary from 1 to 50%, based on the weight of camphor plus impurities. The temperature of the acid treament may vary from below room temperature to the boiling point of the mixture. It is determined largely by the concentration of acid used and the boiling point of the particular camphor-solvent mixture.

Sodium hydroxide, potassium hydroxide, sodium carbonate or any soluble alkali may be used to neutralize the acid after conversion of the impurities has been completed.

Benzene, cyclohexane, and mixtures thereof, or any solvent the boiling point of which is below 130° C. may be used provided it is sufficiently inert to the condensing agent employed.

The fractionation of the treated camphor may take place with or without the presence of an alkali such as sodium hydroxide, potassium hydroxide, lime or dolomite, but we have obtained particularly good results by fractionating in the presence of lime.

Our invention is illustrated by the following examples in which parts are by weight:

*Example I*

Two thousand parts of camphor-benzene-cyclohexane mixture (obtained by esterification of camphene at 60° C. with 93% sulfuric acid-formic acid mixture, saponification of the isoborneol formate, and dehydrogenation of the isoborneol in solution in benzene-cyclohexane mixture) were introduced into a 5 liter flask and 63 parts of 93% sulfuric acid were added. The mixture was agitated at 60° C. for 14 hours. At the end of that time 364 parts of 15% sodium hydroxide solution were added. The mixture was agitated for ½ hour, after which it was allowed to settle. An aqueous layer separated and was removed by decantation. The camphor-benzene-cyclohexane solution was fractionated in the presence of 50 parts of lime. Camphor having a melting range of 167°–169° was secured. Camphor obtained from a portion of the solution by fractionation without a previous acid treatment had a melting range of 154–156° C. The amount of sulfuric acid used was approximately 4%, based on the weight of camphor plus impurities in the solution.

Example II

Two thousand parts of camphor-benzene-cyclohexane mixture (obtained by esterification of camphene with 93% sulfuric acid-formic acid, saponification of the isoborneol formate, and dehydrogenation of the isoborneol in solution in benzene-cyclohexane mixture) was heated at 80° C. with 63 grams of 100% phosphoric acid for a period of 14 hours, with agitation. At the end of that time 182 parts of 30% caustic soda were added, and the camphor-benzene-cyclohexane mixture was fractionated. The camphor secured had a melting range of 166–167° C. A portion of the mixture fractionated without the phosphoric acid treatment had a melting range of 135°–146° C.

The amount of phosphoric acid used was about 5%, based on the weight of camphor plus impurities in the solution.

Example III

Two thousand parts of crude camphor benzene mixture as obtained from the dehydrogenation of isoborneol in benzene was refluxed for 14 hours in the presence of 50 parts of anhydrous aluminum chloride. Three hundred sixty-four (364) parts of water were added. The mixture was agitated for ½ hour, allowed to settle, and the camphor-benzene layer was separated by decantation. The camphor solvent layer was fractionated in the presence of lime, and camphor having a melting range of 164°–169° C. was obtained. Untreated before fractionation, the camphor had a melting range of 135°–146° C.

Example IV

One thousand parts of camphor, melting range 150–155° C. were heated to 40° C. in the presence of 2000 parts of 93% sulfuric acid for a period of 6 hours. The mixture was poured into 4000 parts of cold water. The camphor separated and was washed with 10% caustic soda solution. The impurities were separated by fractionation, and the refined camphor melted above 170° C.

Various modifications of our invention other than already indicated may be made without departing from the scope and spirit thereof. For example, after the acid treatment, the acid may be removed by repeatedly washing the mixture with water and decanting the camphor-solvent layer from the aqueous layer, or by neutralizing the acid and separating the camphor and solvent by steam distillation. Such variations will be apparent to those skilled in the art of camphor rectification.

As many widely different embodiments of this invention may be made without departing from the spirit and scope thereof, it is to be understood that we do not limit ourselves to the specific embodiments thereof except as defined in the appended claims.

We claim:

1. A process for refining camphor which comprises treating camphor in solution in an organic solvent having a boiling point below 130° C. with a small proportion of acid condensing agent sufficient to alter the boiling range of impurities present, neutralizing the treated solution of camphor, and subsequently separating the camphor from solvent and altered impurities by fractional distillation.

2. A process for refining camphor which comprises treating camphor in solution in an organic solvent having a boiling point below 130° C. with not over substantially 5% of an acid condensing agent selected from the group consisting of sulfuric acid, phosphoric acid, hydrogen fluoride, chlor-sulfonic acid, anhydrous aluminum chloride, anhydrous ferric chloride, and fused zinc chloride to alter the boiling range of impurities present, neutralizing the treated solution of camphor, and subsequently separating the camphor from solvent and altered impurities by fractional distillation.

3. A process as in claim 1 in which the camphor treated is crude camphor in mother liquor obtained from the preparation of U. S. P. grade camphor by recrystallization from solvent.

4. A process as in claim 1 in which the camphor treated is a solution of synthetic camphor obtained by dehydrogenation of isoborneol in an organic solvent.

CLYDE O. HENKE.
GASTAŌ ETZEL.